United States Patent
Lin et al.

(10) Patent No.: US 9,417,735 B2
(45) Date of Patent: Aug. 16, 2016

(54) OPTICAL TOUCH MODULE HAVING SINGLE-ROW SERIAL CONNECTION STRUCTURE AND OPTICAL MULTI-TOUCH DEVICE HAVING THE SAME

(71) Applicant: Quanta Computer Inc., Taoyuan Shien (TW)

(72) Inventors: Wan-Chi Lin, Taichung (TW); Bo-Ren Yan, Taichung (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 548 days.

(21) Appl. No.: 13/952,699

(22) Filed: Jul. 29, 2013

(65) Prior Publication Data

US 2014/0218633 A1    Aug. 7, 2014

(30) Foreign Application Priority Data

Feb. 5, 2013   (TW) .............................. 102104420 A (51) Int. Cl.
 *G06F 3/041*    (2006.01)
 *G06F 3/042*    (2006.01)

(52) U.S. Cl.
 CPC .................... *G06F 3/0421* (2013.01)

(58) Field of Classification Search
 CPC ..... G06F 3/042; G06F 3/0421; G06F 3/0425; G06F 3/0428; G06F 2203/04109
 USPC ......................... 361/600, 679.01, 679.02, 760
 See application file for complete search history.

(56) References Cited

U.S. PATENT DOCUMENTS

| | | | |
|---|---|---|---|
| 7,443,387 B2 | 10/2008 | Tanaka et al. | |
| 8,294,692 B2 | 10/2012 | Tsai et al. | |
| 2010/0295821 A1* | 11/2010 | Chang | G06F 3/0421 345/175 |
| 2011/0096034 A1* | 4/2011 | Huang | G06F 3/0428 345/175 |
| 2011/0141034 A1* | 6/2011 | Lai | G06F 3/041 345/173 |
| 2012/0075217 A1 | 3/2012 | Liu et al. | |
| 2012/0098796 A1* | 4/2012 | Lin | G06F 3/0428 345/175 |
| 2014/0022448 A1* | 1/2014 | McGibney | G06F 3/0308 348/370 |

FOREIGN PATENT DOCUMENTS

| | | |
|---|---|---|
| CN | 101976156 A | 2/2011 |
| CN | 102419666 A | 4/2012 |
| TW | M358363 U | 6/2009 |
| TW | 201011616 A1 | 3/2010 |
| TW | 201120710 A1 | 6/2011 |
| TW | 201145088 A1 | 12/2011 |

* cited by examiner

*Primary Examiner* — Ram Mistry
(74) *Attorney, Agent, or Firm* — Rabin & Berdo, P.C.

(57) ABSTRACT

An optical touch module and an optical multi-touch device are disclosed. The optical touch module includes a glass panel, a control board unit and plural optical sensing sets. The glass panel is divided into a sensing zone and a peripheral zone surrounding the sensing zone. The control board unit is disposed on a rear surface of the glass panel and located completely within the peripheral zone. The optical sensing sets are disposed at intervals within the peripheral zone of the glass panel. The optical sensing sets are electrically connected to the control board unit, and the optical sensing sets and the control board unit jointly form a single-row serial connection structure.

7 Claims, 7 Drawing Sheets

OPTICAL TOUCH MODULE HAVING SINGLE-ROW SERIAL CONNECTION STRUCTURE AND OPTICAL MULTI-TOUCH DEVICE HAVING THE SAME

RELATED APPLICATIONS

This application claims priority to Taiwan Application Serial Number 102104420, filed Feb. 5, 2013, which are herein incorporated by reference.

BACKGROUND

1. Field of Disclosure

The disclosure relates to an optical touch device. More particularly, the disclosure relates to an optical multi-touch device and its optical touch module.

2. Description of Related Art

A conventional optical touch device includes an optical touch panel and a display panel, in which the optical touch panel is disposed over the display panel. Signals detected by sensors of the optical touch panel can be transferred via flexible wires (e.g., flexible printed circuits or flexible flat cables) to a control board unit external to the optical touch device.

However, a downstream manufacturer is under a limitation that the optical touch panel and the display panel has to be assembled in advance, and the flexible wires can be respectively bent to one side of the display panel which is opposite to the optical touch panel so as being individually connected to the control board unit. The mentioned limitation would lower the convenience increase the working hour in assembling. As such, the downstream manufacturer is forced to add an additional wire layout, which affects the flexibility in the system design.

SUMMARY

The present disclosure is to provide an optical multi-touch device and its optical touch module, in which the wiring layout for sensors are modified for increasing the convenience in assembling and lowering the working hours, and also reducing the amount of wires required for connecting sensors.

The present disclosure is to provide an optical multi-touch device and its optical touch module, in which a control board unit is integrated on the optical touch module thereby improving the space for system arrangement, solving the problem of a printed circuit used for controlling being required to be individually installed, and increasing the design flexibility for the whole system.

According to one embodiment of the present disclosure, the optical touch module includes a glass panel, a control board unit and plural optical sensing sets. The glass panel includes a front surface and a rear surface opposite to the front surface, and the glass panel is divided into a sensing zone and a peripheral zone surrounding the sensing zone. The control board unit is disposed on the rear surface of the glass panel and located completely within the peripheral zone. The optical sensing sets are disposed at intervals within the peripheral zone of the glass panel. The optical sensing sets are electrically connected to the control board unit, and the optical sensing sets and the control board unit jointly form a single-row serial connection structure.

According to one embodiment of the present disclosure, the optical multi-touch device includes a display panel and an optical touch module. The display panel includes an effective display zone and plural lateral sidewalls surrounding the effective display zone. The optical touch module includes a glass panel, a control board unit and plural optical sensing sets. The glass panel includes a front surface and a rear surface opposite to the front surface, the rear surface is disposed on the effective display zone of the display panel, and the glass panel is divided into a sensing zone and a peripheral zone, the sensing zone is corresponding to the effective display zone and surrounded by the peripheral zone. The control board unit is disposed on the rear surface of the glass panel and located completely within the peripheral zone. The optical sensing sets are disposed at intervals within the peripheral zone of the glass panel. The optical sensing sets are electrically connected to the control board unit, and the optical sensing sets and the control board unit jointly form a single-row serial connection structure.

As what has been disclosed above, with the novel design of the optical multi-touch device and its optical touch module provided by the present disclosure, the control board unit is enabled to be integrated within the peripheral zone on the rear surface of the glass panel, so the single-row serial connection structure is only arranged within the peripheral zone on the rear surface of the glass panel, so after the display panel is laminated with the optical touch module, more system layout space can be saved thereby increasing the design flexibility for the whole system.

BRIEF DESCRIPTION OF THE DRAWINGS

The present disclosure will be apparent to those skilled in the art by reading the following detailed description of a preferred embodiment thereof, with reference to the attached drawings, in which.

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

Figure 1:
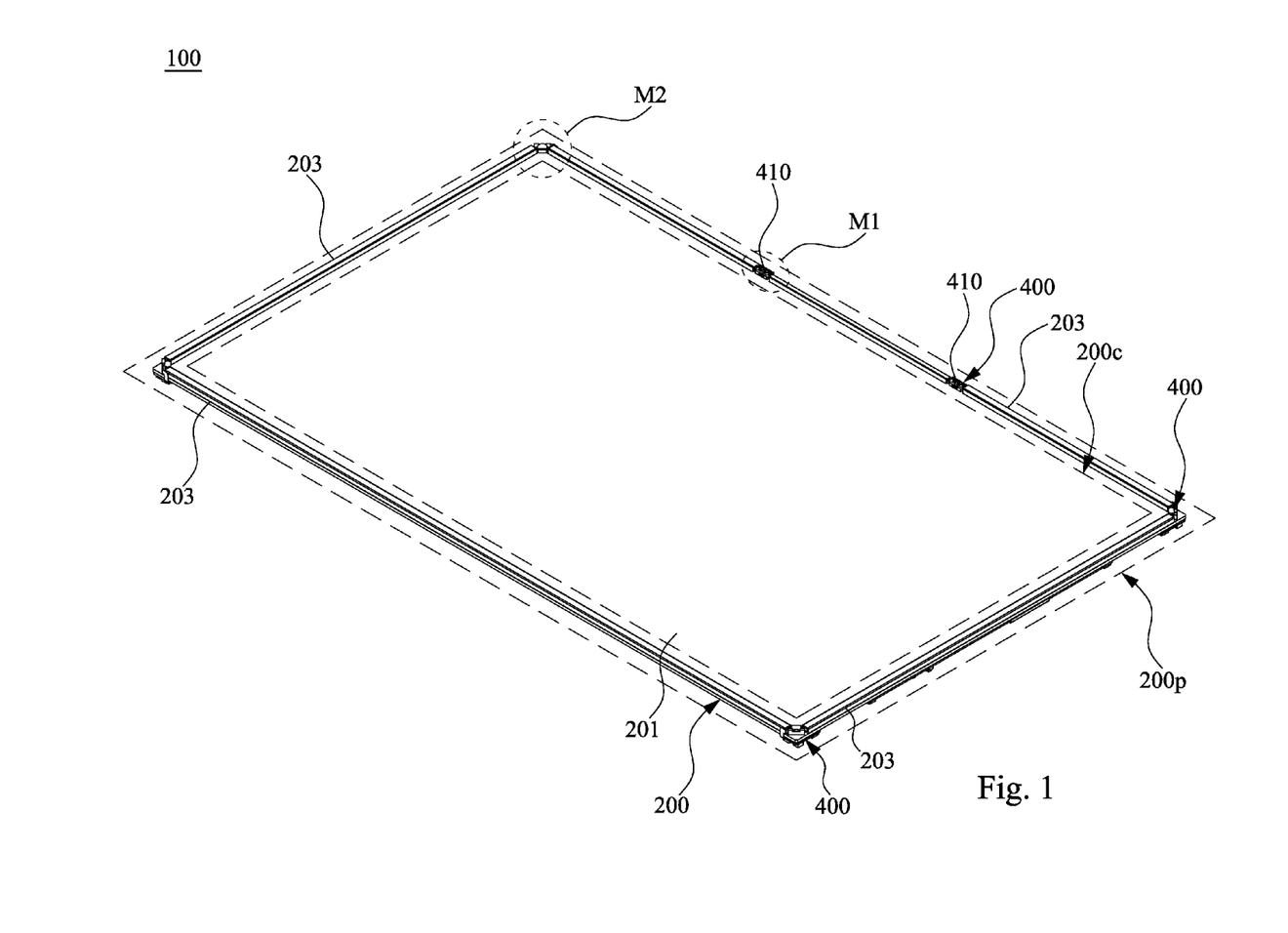
FIG. 1 is a front view showing the optical touch module according to one embodiment of the present disclosure.
Figure 2:
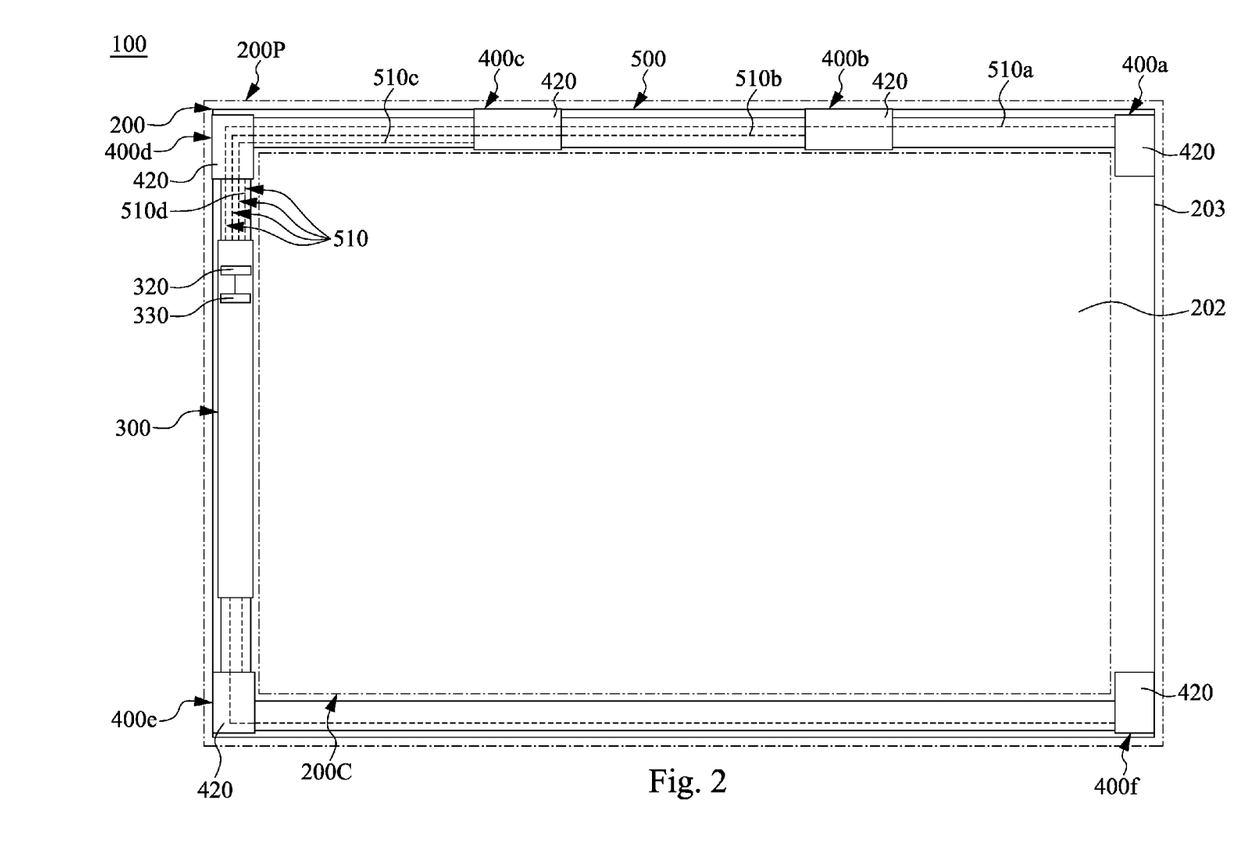
FIG. 2 is a rear view showing the optical touch module according to this embodiment of the present disclosure.

Reference is now made to FIG. 1 and FIG. 2 in which FIG. 1 is a front view showing the optical touch module 100 according to one embodiment of the present disclosure, and FIG. 2 is a rear view showing the optical touch module 100 according to this embodiment of the present disclosure.

As shown in FIG. 1 and FIG. 2, the present disclosure provides an optical touch module 100. The optical touch module 100 includes a glass panel 200, a control board unit 300 and a plurality of optical sensing sets 400.

The glass panel 200 includes a front surface 201, a rear surface 202 opposite to the front surface 201, and a plurality of lateral sides 203 surrounding and adjacent to the front surface 201 and the rear surface 202. The whole area of the glass panel 200 is divided into a sensing zone 200C and a peripheral zone 200P. The sensing zone 200C is defined as the area of the glass panel 200 for being touched and sensed, the peripheral zone 200P surrounds the sensing zone 200C, and the peripheral zone 200P includes the other area of the glass panel 200 where the sensing zone 200c is precluded. The control board unit 300 is disposed on the rear surface 202 of the glass panel 200 and completely arranged within the peripheral zone 200P.

The optical sensing sets 400 are arranged at intervals in the peripheral zone 200P of the glass panel 200, and each of the optical sensing sets 400 is extended from the front surface 201 through the lateral sides 203 to the rear surface 202 of the glass panel 200.

As shown in FIG. 2, the optical sensing sets 400 are electrically connected to the control board unit 300, and both the optical sensing sets 400 and the control board unit 300 are disposed so as to form a single-row serial connection structure 500. The single-row serial connection structure 500 is defined as that the optical sensing sets 400 and the control board unit 300 are electrically connected together with a one-by-one arrangement, and the control board unit 300 is arranged between only two optical sensing sets 400.

As shown in FIG. 2, the glass panel 200 has four lateral sides 203 including two long lateral sides and two short lateral sides. The optical sensing sets 400 are respectively disposed at junctions of the two long lateral sides 203 and the two short lateral sides 203, and the control board unit 300 is disposed at one short lateral side 203 of the rear surface 202 of the glass panel 200.

For example, the optical sensing sets 400, e.g., six sets (as shown in FIG. 2), can be named as the first optical sensing set 400a to the sixth optical sensing set 400f respectively from the upper right, the upper left, the lower left to the lower right. Thus, the single-row serial connection structure 500 is formed by serially connecting the first optical sensing set 400a to the fourth optical sensing set 400d, the control board unit 300, the fifth optical sensing set 400e and the sixth optical sensing set 400f in single-row.

Figure 3:
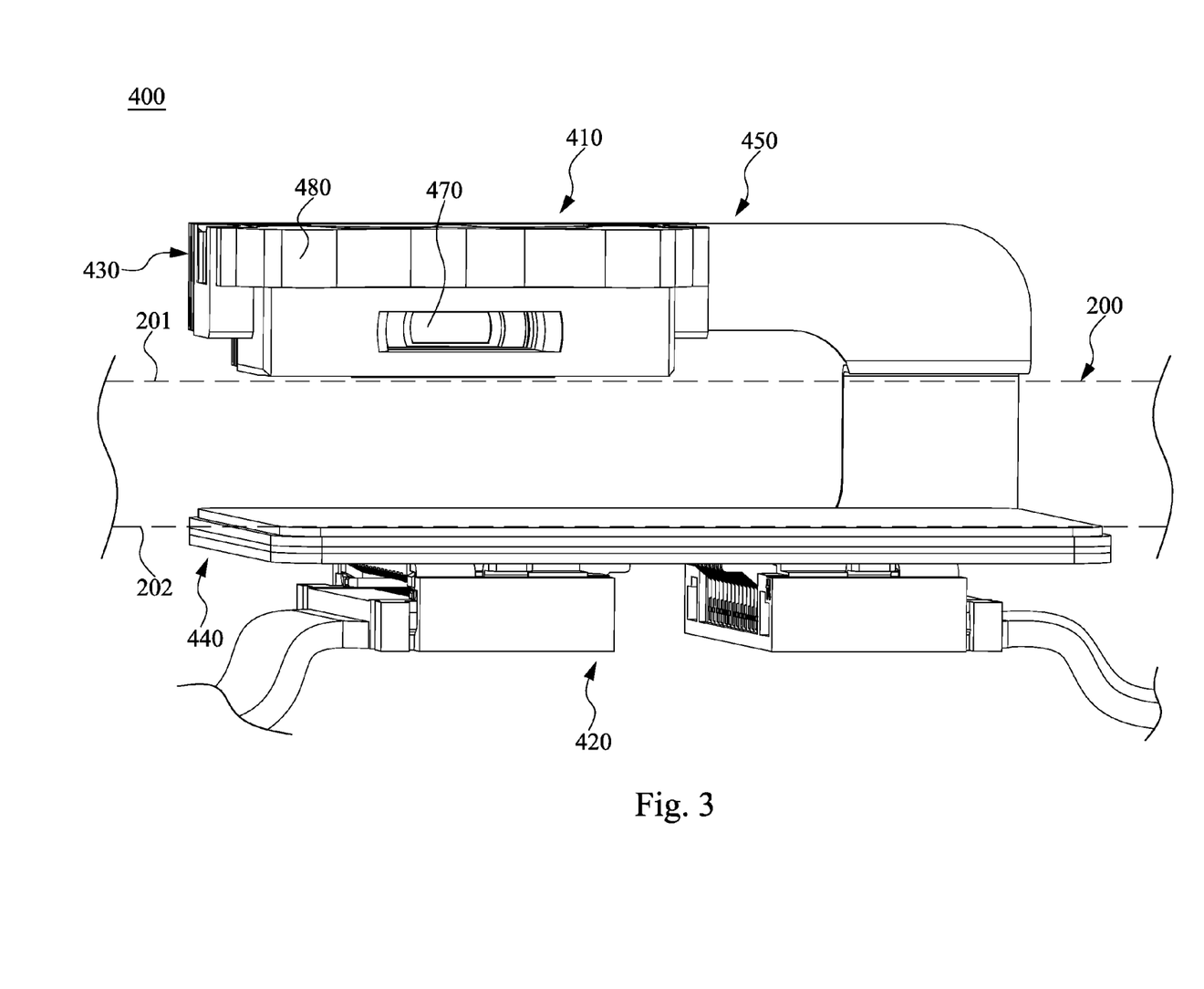
FIG. 3 is a schematic view showing an optical sensing set of the optical touch module according to one alternative of this embodiment.

Each of the optical sensing sets 400 includes an optical sensing unit 410 and a signal transferring portion 420. The optical sensing unit 410 is disposed on the front surface 201 of the glass panel 200, and used for emitting and receiving an optical signal (as shown in FIG. 1). The signal transferring portion 420 is disposed on the rear surface 202 of the glass panel 200, and electrically connected to the optical sensing unit 410 (as shown in FIG. 2) through a flexible printed circuit 450 (as shown in FIG. 3). Because the signal transferring portions 420 are in serial connected to the control board unit 300 electrically, one of the signal transferring portions 420 transfers the detected signal via another signal transferring portion 420 to the control board unit 300.

The single-row serial connection structure 500 includes plural conductive passages 510. The conductive passages 510 are electrically insulated with one another and arranged at intervals on the rear surface 202 of the glass panel 200. Each of the conductive passages 510 is electrically connected to the control board unit 300 and one of the optical sensing units 410, so each of the optical sensing units 410 transfers the signal to the control board unit 300 through the corresponding conductive passage 510 only. The conductive passage 510 is not limited to a certain type as long as each of the optical sensing units 410 is worked to transfer signals to the control board unit 300.

According to the example mentioned above, the first conductive passage 510a first passes through from the first optical sensing set 400a and sequentially passes through the second optical sensing set 400b, the third optical sensing set 400c, the fourth optical sensing set 400d, and then connects to the control board unit 300; the second conductive passage 510b first passes through from the second optical sensing set 400b and sequentially passes through the third optical sensing set 400c and the fourth optical sensing set 400d, and then connects to the control board unit 300; the third conductive passage 510c first passes through from the third optical sensing set 400c and sequentially passes the fourth optical sensing set 400d, and then connects to the control board unit 300; the fourth conductive passage 510d first passes through from the fourth optical sensing set 400d, and connects to the control board unit 300.

According to one embodiment of the present disclosure, the quantity of the conductive passages 510 between two adjacent signal transferring portions 420 is the same and conducted one by one.

According to one embodiment of the present disclosure, by using a flexible printed circuit (FPC) or a flexible flat cable (FFC), the conductive passage 510 can be adopted with a detachable mode or a fixing mode, e.g., HotBar or Anisotropic Conductive Film (ACF) to couple between any two adjacent signal transferring portions 420.

Moreover, the flexible printed circuit (FPC) or the flexible flat cable (FFC) of the conductive passage 510 can be tightly adhered on the rear surface 202 of the glass panel 200 by using adhesive.

Or, wires (e.g., electric conductive silver pastes) can be directly formed (e.g., printed) on the rear surface 202 of the glass panel 200 to make the conductive passages 510, so that any of the optical sensing sets 400 is electrically connected to the control board unit 300.

FIG. 3 is a schematic view showing an optical sensing set 400 of the optical touch module according to one alternative of this embodiment.

As shown in FIG. 3, each of the optical sensing sets 400 further includes a first printed circuit 430, a second printed circuit 440 and a flexible printed circuit 450 electrically connecting to the first printed circuit 430 and the second printed circuit 440. The first printed circuit 430 is fixedly disposed on the front surface 201 of the glass panel 200 and arranged within the peripheral zone 200P (as shown in FIG. 1). The second printed circuit 440 is fixedly disposed on the rear surface 202 of the glass panel 200 and arranged within the peripheral zone 200P (as shown in FIG. 2).

The optical sensing unit 410 is fixedly disposed on the first printed circuit 430, and the first printed circuit 430 controls the optical sensing unit 410; the signal transferring portion 420 is fixedly disposed on the second printed circuit 440, and the second printed circuit 440 controls the signal transferring portion 420 and transfers detected signals from the optical sensing unit 410 to the control board unit 300; flexible printed circuit 450 also electrically connects to the optical sensing unit 410 and the signal transferring portion 420, and transfers signals received by the optical sensing unit 410 to the signal transferring portion 420. Furthermore, the flexible printed circuit 450 is bent and turned over from the front surface 201 to the rear surface 202 of the glass panel 200.

Figure 4A:
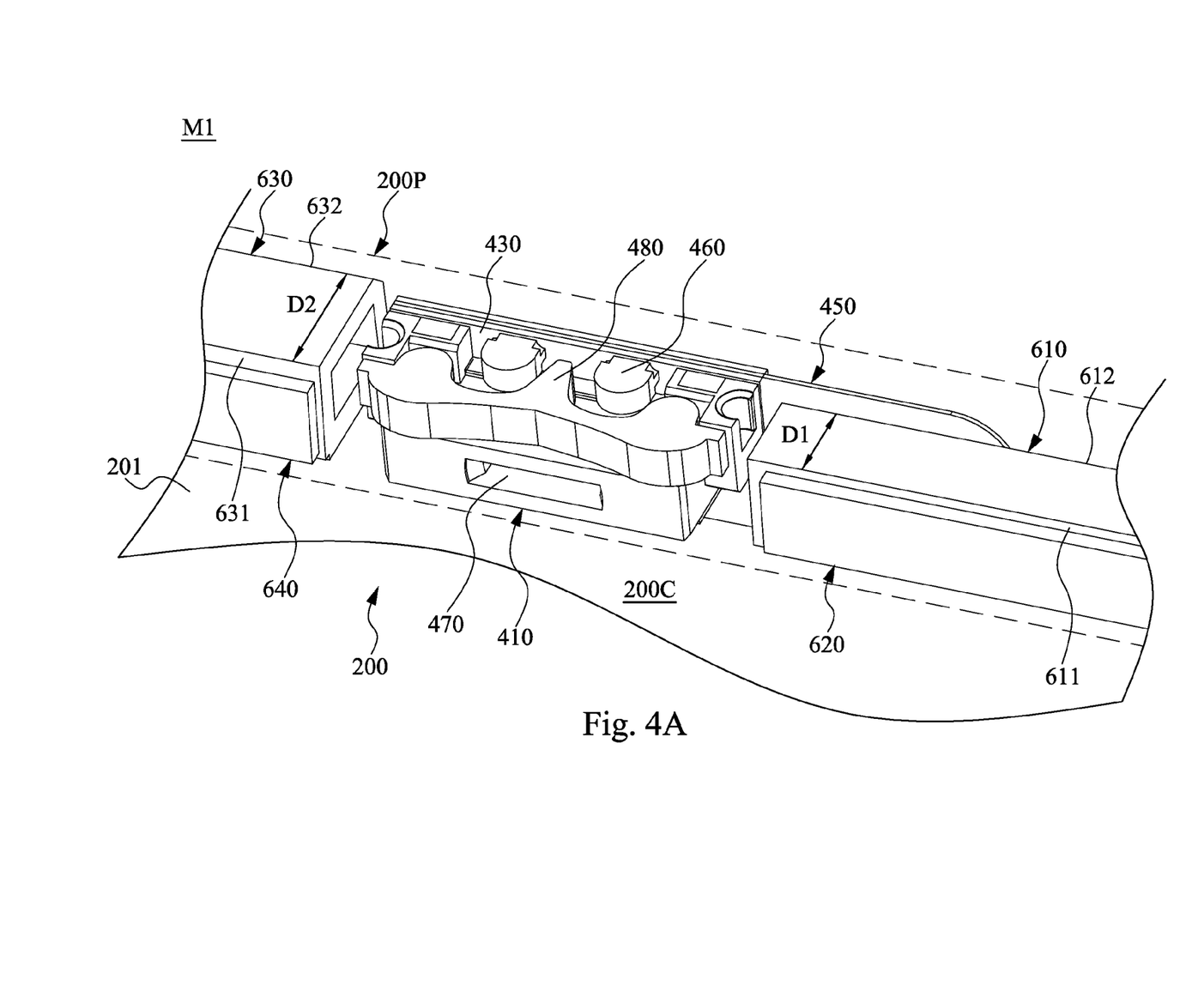
FIG. 4A is a partially enlarged view showing the zone M1 of FIG. 1.

FIG. 4A is a partially enlarged view showing the zone M1 of FIG. 1. As shown in FIG. 1 and FIG. 4A, the optical touch module 100 further includes plural strip-shaped carrier (as known as extruded strip) and light reflecting strips used for reflecting optical signals. The strip-shaped carriers are arranged at intervals on the front surface 201 of the glass panel 200 and completely within the peripheral zone 200P.

For instance, the right strip-shaped carrier and the left strip-shaped carrier shown in FIG. 4A are respectively named as the first strip-shaped carrier 610 and the second strip-shaped carrier 630, and the light reflecting strips disposed on the first strip-shaped carrier 610 and the second strip-shaped carrier 630 are respectively named as the first light reflecting strip 620 and the second light reflecting strip 640. The first strip-shaped carrier 610 includes a first surface 611 and a second surface 612 opposite to the first surface 611, and the first light reflecting strip 620 is disposed on the first surface 611. The second strip-shaped carrier 630 includes a third surface 631 and a fourth surface 632 opposite to the third surface 631, and the second light reflecting strip 640 is disposed on the third surface 631. According to one embodiment of the present disclosure, the light reflecting strip can be directly configured within or adhered to the peripheral zone 200P without installation of the strip-shaped carrier.

What shall be addressed is that the thickness D1 defined between the first surface 611 and the second surface 612 is smaller than the thickness D2 defined between the third surface 631 and the fourth surface 632, so the flexible printed circuit 450 by which the optical sensing set 400 extended to the rear surface 202 will not interfere with the first strip-shaped carrier 610.

Figure 4B:
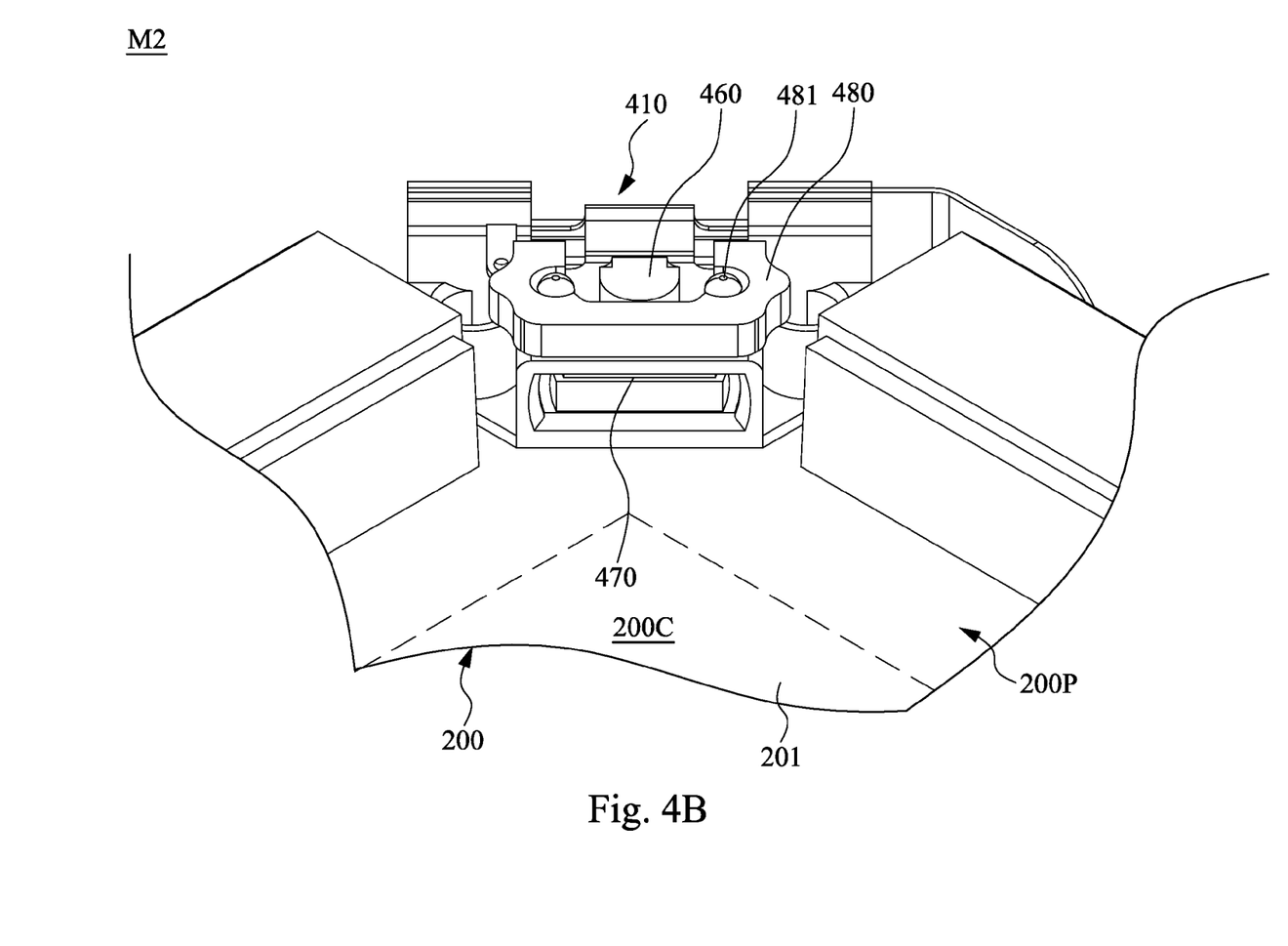
FIG. 4B is a partially enlarged view showing the zone M2 of FIG. 1.

FIG. 4B is a partially enlarged view showing the zone M2 of FIG. 1. As shown in FIG. 3 and FIG. 4B, each of the optical sensing units 410 further includes at least a light emitting unit 460, a light sensor 470 and a protective cover 480.

The light emitting unit 460 (e.g., an infrared light emitting diode) emits optical signals. The command to emit optical signal to each of the optical signals is transferred from the control board unit 300 (as shown in FIG. 2) through the conductive passage 510 to each of the optical sensing units 410. The light sensor 470 is disposed below the light emitting unit 460. The light sensor 470 receives optical sensing signals when the sensing zone 200C is touched, and the optical sensing signal is transferred through the conductive passage 510 to the control board unit 300.

The protective cover 480 having light permeable characteristics allow only infrared to permeate, which is not visible to human. The protective cover 480 covers the light emitting unit 460, e.g., the protective cover 480 is fixedly disposed on one side of the light emitting surface of the light emitting unit 460 through two fasten posts 481, so as to prevent dusts from depositing on the light emitting unit 460 and keep the light emitting efficiency, or prevent dusts from depositing on the front surface 201 of the glass panel 200 and remain the viewing field of the light sensor 470.

Reference is now made to FIG. 1 and FIG. 2 again. The control board unit 300 further includes a control unit 320. The control unit 320 is disposed on the control board unit 300. When the sensing zone 200C is touched (as shown in FIG. 1), at least three of the light sensors 470 capture the corresponding optical sensing signals, so the control unit 320 calculates the location where the sensing zone 200C being touched according to the optical sensing signals.

Preferably, referring to FIG. 1 and FIG. 2, the control board unit 300 further includes a vibration sensing unit 330. The vibration sensing unit 330 is disposed on the control board unit 300, and electrically connected to the control unit 320. The control unit 320 calculates the location where the sensing zone 200C being touched according to the optical sensing signals, only when the control unit 320 receives a vibration signal and the optical sensing signals at the same time. Thus, misjudging the generation of optical sensing signal can be avoided or at least reduced, and the optical sensing signal can be accurately received when an actual touching action is made.

Figure 5:
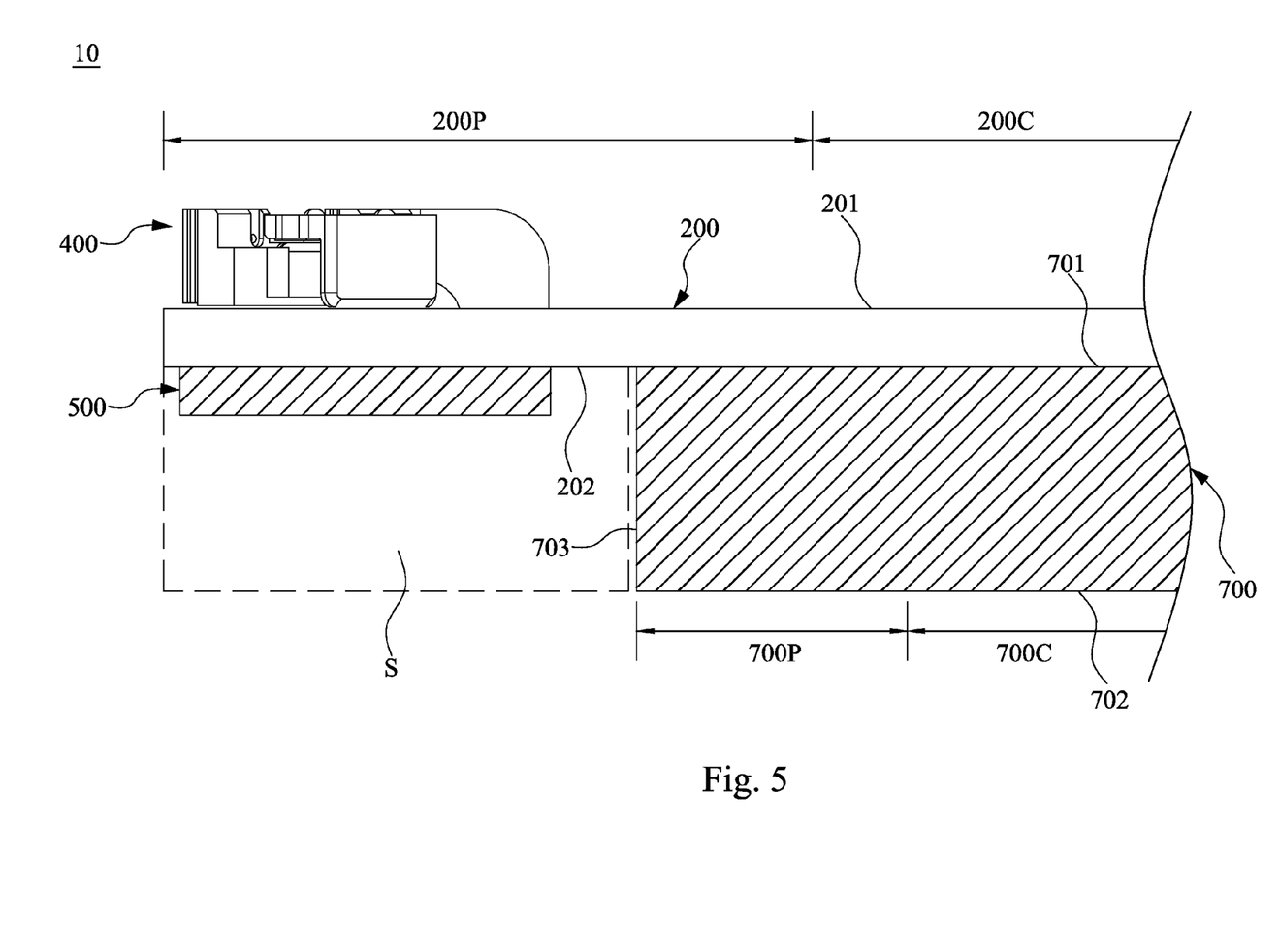
FIG. 5 is partial side view showing the optical multi-touch device according to one embodiment of the present disclosure.

As shown in FIG. 5, the optical touch module 100 is disposed on a display panel 700 thereby assembling an optical multi-touch device 10 which allows a user to touch the optical touch module 100.

The display panel 700 includes a front side 701 and a rear side 702 opposite to the front side 701, and plural lateral sidewalls 703 surrounding and adjacent to the front side 701 and the rear side 702. The front side 701 of the display panel 700 is divided into an effective display zone 700C and a surrounding zone 700P. The effective display zone 700C is defined as the area of the display panel 700 for displaying. The effective display zone 700C is surrounded by the surrounding zone 700P and the lateral sidewalls 703. The rear surface 202 of the glass panel 200 is disposed on the effective display zone 700C of the display panel 700, and the sensing zone 200C of the glass panel 200 is corresponding to the effective display zone 700C, and the area of the sensing zone 200C is larger than the area of the effective display zone 700C.

However, according to one alternative, the area of the effective display zone 700C can be equal to the area of the sensing zone 200C.

According to this embodiment, the area of the rear surface 202 of the glass panel 200 is larger than the area of the front side 701 of the display panel 700, and a sectional space S is formed below the peripheral zone 200P of the glass panel 200 and aside of the lateral sidewalls 703 of the display panel 700, such that the single-row serial connection structure 500 can be extended from the rear surface 202 of the glass panel 200 into the sectional space S and accommodated in the sectional space S (including the control board unit 300 and the signal transferring portions 420). Because the thickness of the display panel 700 is greater than the thickness of the single-row serial connection structure 500, the single-row serial connection structure 500 can be effectively protected from being extruded and damaged due to an external force.

According to another embodiment of the present disclosure, when the area of the rear surface 202 of the glass panel 200 is smaller than or equal to the area of the front side 701 of the display panel 700, the single-row serial connection structure 500 is disposed between the surrounding zone 700P and the glass panel 200.

Figure 6:
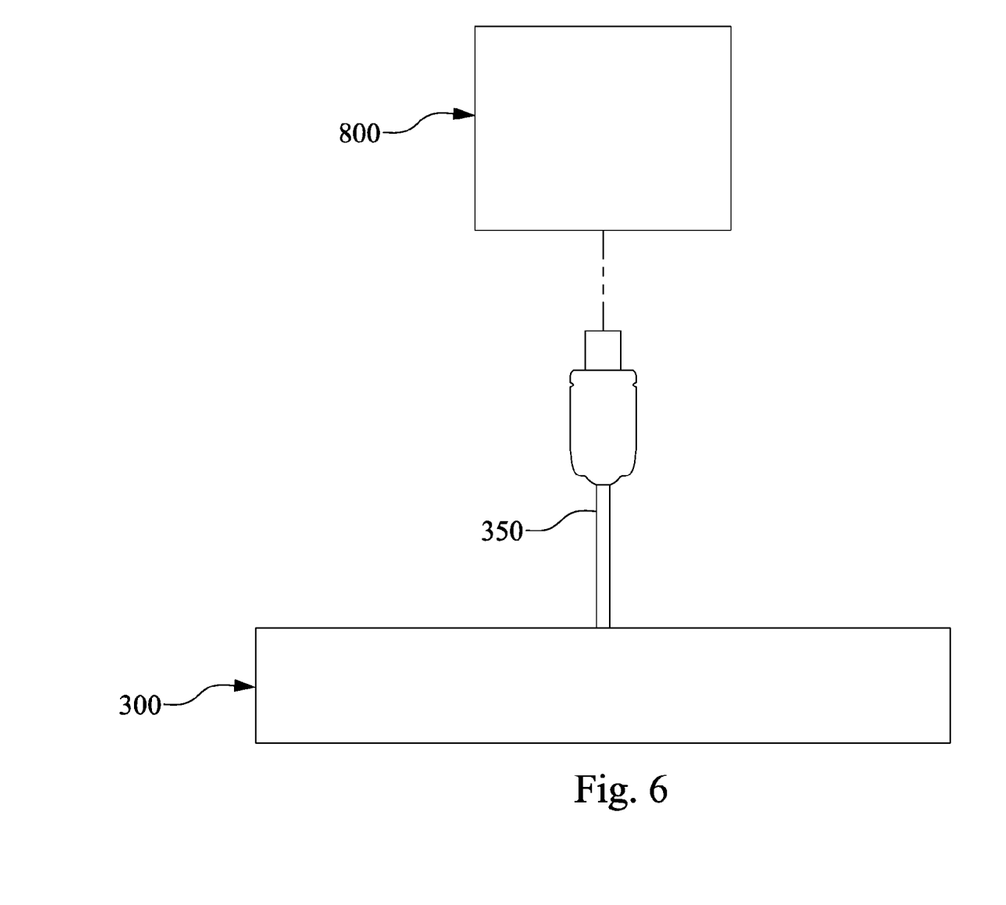
FIG. 6 is a schematic view showing the control board unit of the optical touch module of the optical multi-touch device being connected to a system mainframe according to another embodiment of the present disclosure.

FIG. 6 is a schematic view showing the control board unit 300 of the optical touch module 100 of the optical multi-touch device being connected to a system mainframe 800 according to another embodiment of the present disclosure.

The control board unit 300 further includes single output unit 350 (e.g., a USB cable). The single output unit 350 is disposed on the control board unit 300, and used for outputting the data of the location where the sensing zone 200C being touched to a system mainframe 800 of the optical multi-touch device.

Therefore, after the downstream manufacturer assembles the optical touch module 100 to the display panel 700, an additional control board unit 300 and flexible cables are not required, the single output unit 350 is enabled to be directly connected to the system mainframe 800, so the consideration of wiring layout is saved, thereby greatly increasing the convenience in assembling and lowering the working hours, also greatly reducing the assembling difficulty and simplifying the design of the touch module.

Although the present disclosure has been described with reference to the preferred embodiments thereof, it is apparent to those skilled in the art that a variety of modifications and changes may be made without departing from the scope of the present disclosure which is intended to be defined by the appended claims.

The readers attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An optical touch module, comprising:
    a glass panel comprising a front surface and a rear surface opposite to the front surface, the glass panel being divided into a sensing zone and a peripheral zone surrounding the sensing zone;
    a first strip-shaped carrier disposed on the front surface of the glass panel and arranged within the peripheral zone, the first strip-shaped carrier comprising a first surface and a second surface opposite to the first surface;
    a first light reflecting strip disposed on the first surface of the first strip-shaped carrier;
    a second strip-shaped carrier disposed on the front surface of the glass panel and arranged within the peripheral zone, the second strip-shaped carrier comprising a third surface and a fourth surface opposite to the third surface;
    a second light reflecting strip disposed on the third surface of the second strip-shaped carrier, wherein a first thickness defined between the first surface and the second surface is smaller than a second thickness defined between the third surface and the fourth surface;
    a control board unit disposed on the rear surface of the glass panel and located completely within the peripheral zone; and
    a plurality of optical sensing sets disposed at intervals within the peripheral zone of the glass panel, each of the optical sensing sets comprising:
        an optical sensing unit disposed on the front surface of the glass panel, for emitting and receiving an optical signal;
        a signal transferring portion disposed on the rear surface of the glass panel, and electrically connected to the optical sensing unit; and
        a flexible printed circuit electrically connected to the optical sensing unit and the signal transferring portion,
    wherein the signal transferring portions of the optical sensing sets are electrically connected to the control board unit in serial, and the optical sensing sets and the control board unit jointly form a single-row serial connection structure, and the signal transferring portion of one optical sensing set of the optical sensing sets transfers a signal, based upon the optical signal received by the optical sensing unit of the one optical sensing set, via another of the signal transferring portions to the control board unit.

2. The optical touch module according to claim 1, wherein the single-row serial connection structure comprises:
    a plurality of conductive passages electrically insulated with one another, wherein
    each of the conductive passages is connected to the control board unit and one of the optical sensing units, and each respective optical sensing unit of the optical sensing units transfers a signal, based upon the optical signal received by the respective optical sensing unit, to the control board unit via only one of the conductive passages.

3. The optical touch module according to claim 1, wherein each of the optical sensing units further comprises:
    at least one light emitting unit emitting an optical output signal;
    a light sensor receiving an optical sensing signal when the sensing zone is touched; and
    a protective cover having a light permeable characteristic, and covering the light emitting unit,
    wherein the control board unit further comprises:
    a control unit disposed on a part of the control board unit; and
    a vibration sensing unit disposed on a portion of the control board unit, electrically connected to the control unit, generating a vibration signal and transmitting the vibration signal to the control unit when the sensing zone is touched,
    wherein the control unit calculates the location where the sensing zone is touched according to the optical sensing signals, only when the control unit receives the vibration signal and the optical sensing signals at the same time.

4. An optical multi-touch device, comprising:
    a display panel comprising an effective display zone and a plurality of lateral sidewalls surrounding the effective display zone; and
    an optical touch module comprising:
        a glass panel, comprising a front surface and a rear surface opposite to the front surface, the rear surface being disposed on the effective display zone of the display panel, the glass panel being divided into a sensing zone and a peripheral zone, the sensing zone corresponding to the effective display zone and being surrounded by the peripheral zone;
        a first strip-shaped carrier disposed on the front surface of the glass panel, arranged within the peripheral zone, and comprising a first surface and a second surface opposite to the first surface;
        a first light reflecting strip disposed on the first surface of the first strip-shaped carrier;
        a second strip-shaped carrier disposed on the front surface of the glass panel, arranged within the peripheral zone, and comprising a third surface and a fourth surface opposite to the third surface;
        a second light reflecting strip disposed on the third surface of the second strip-shaped carrier, wherein a first thickness defined between the first surface and the second surface is smaller than a second thickness defined between the third surface and the fourth surface;
        a control board unit, disposed on the rear surface of the glass panel and arranged completely within the peripheral zone; and
        a plurality of optical sensing sets disposed at intervals within the peripheral zone of the glass panel, each of the optical sensing sets comprising:
            an optical sensing unit disposed on the front surface of the glass panel for emitting and receiving an optical signal; and
            a signal transferring portion disposed on the rear surface of the glass panel, and electrically connected to the optical sensing unit;
        wherein the signal transferring portions of the optical sensing sets are electrically connected to the control board unit in serial, and the optical sensing sets and the control board unit jointly form a single-row serial connection structure, and the signal transferring portion of one optical sensing set of the optical sensing sets transfers a signal, based upon the optical signal received by the optical sensing unit of the one optical sensing set, via another of the signal transferring portions to the control board unit.

5. The optical multi-touch device according to claim 4, wherein a surface area of the rear surface of the glass panel is larger than a surface area of the display panel having the effective display zone, and a sectional space is formed below the peripheral zone of the glass panel and aside the lateral sidewalls of the display panel, the single-row serial connection structure extends from the rear surface of the glass panel into the sectional space.

6. The optical multi-touch device according to claim 4, wherein the single-row serial connection structure comprises:
   a plurality of conductive passages electrically insulated with one another, wherein
   each of the conductive passages is connected to the control board unit and one of the optical sensing units, and
   each respective optical sensing unit of the optical sensing units transfers a signal, based upon the optical signal received by the respective optical sensing unit, to the control board unit via only one of the conductive passages.

7. The optical multi-touch device according to claim 4, wherein each of the optical sensing units further comprises:
   at least one light emitting unit emitting an optical output signal;
   a light sensor receiving an optical sensing signal when the sensing zone is touched; and
   a protective cover having a light permeable characteristic, and covering the light emitting unit,
   wherein the control board unit further comprises:
   a control unit disposed on a part of the control board unit; and
   a vibration sensing unit disposed on a portion of the control board unit, electrically connected to the control unit, generating a vibration signal and transmitting the vibration signal to the control unit when the sensing zone is touched,
   wherein the control unit calculates the location where the sensing zone is touched according to the optical sensing signals, only when the control unit receives the vibration signal and the optical sensing signals at the same time.

\* \* \* \* \*